United States Patent
Minty (10) Patent No.: US 9,452,846 B2
(45) Date of Patent: Sep. 27, 2016

(54) WATER SCAVENGING SYSTEM (75) Inventor: Andrew Minty, Bristol (GB)

(73) Assignee: Airbus Operations Limited, Bristol (GB)

( * ) Notice: Subject to any disclaimer, the term of this patent is extended or adjusted under 35 U.S.C. 154(b) by 1936 days.

(21) Appl. No.: 12/449,482

(22) PCT Filed: Mar. 5, 2008

(86) PCT No.: PCT/GB2008/050156
§ 371 (c)(1),
(2), (4) Date: Aug. 11, 2009

(87) PCT Pub. No.: WO2008/110838
PCT Pub. Date: Sep. 18, 2008

(65) Prior Publication Data
US 2010/0006512 A1 Jan. 14, 2010

(30) Foreign Application Priority Data

Mar. 12, 2007 (GB) .................................. 0704725.1
Jun. 4, 2007 (GB) .................................. 0710621.4

(51) Int. Cl.
*B64D 37/22* (2006.01)
*B64D 37/14* (2006.01)
*B64D 37/34* (2006.01)

(52) U.S. Cl.
CPC ............. *B64D 37/22* (2013.01); *B64D 37/14* (2013.01); *B64D 37/34* (2013.01)

(58) Field of Classification Search
CPC ..................................................... B64D 37/42
USPC ..... 244/135 R, 136, 135 A; 137/45, 38, 171, 137/899.2
See application file for complete search history.

(56) References Cited

U.S. PATENT DOCUMENTS

| 1,581,595 A | 4/1926 | Osborne et al. |
| 2,194,348 A | 3/1940 | Zoder |
| 3,079,941 A * | 3/1963 | Cruise et al. ................. 137/266 |

(Continued)

FOREIGN PATENT DOCUMENTS

| EP | 0 233 696 | 8/1987 |
| EP | 0 278 755 | 8/1988 |

(Continued)

OTHER PUBLICATIONS

International Search Report for PCT/GB2008/050156 mailed Jun. 12, 2008.

(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

A method of removing water (7) from a fuel tank (2) using a water scavenging line (4) which has an inlet (6) immersed in the water and an outlet (5) coupled to a water tank (3). The method comprises filling the fuel tank with fuel (30) whereby the fuel exerts hydrostatic pressure on the water, the hydrostatic pressure driving the water up the water scavengingline against the force of gravity and into the water tank. The use of hydrostatic pressure provides an automatic and relatively simple method of extracting the water from the bottom of the fuel tank. The water tank enables the extracted water to be stored for disposal at a later time, typically by feeding the water into an engine.

27 Claims, 11 Drawing Sheets (56) References Cited

U.S. PATENT DOCUMENTS

| | | | |
|---|---|---|---|
| 3,182,800 A * | 5/1965 | Landree et al. | 210/96.1 |
| 3,982,794 A | 9/1976 | Colovas et al. | |
| 4,057,603 A | 11/1977 | Irie | |
| 4,519,349 A * | 5/1985 | Cheney | 123/198 R |
| 4,756,328 A | 7/1988 | Sherwood | |
| 4,799,504 A * | 1/1989 | Scragg et al. | 137/38 |
| 4,809,934 A * | 3/1989 | Rix | 244/135 R |
| 5,705,056 A * | 1/1998 | Scragg | 210/123 |
| 6,170,470 B1 | 1/2001 | Clarkson et al. | |
| 6,368,498 B1 * | 4/2002 | Guilmette | 210/123 |
| 7,185,707 B1 * | 3/2007 | Graham | 166/371 |
| 7,655,140 B2 * | 2/2010 | Wieczorek et al. | 210/120 |
| 2001/0023710 A1 | 9/2001 | Tung Kong et al. | |

FOREIGN PATENT DOCUMENTS

| | | |
|---|---|---|
| GB | 2 042 358 | 9/1990 |
| GB | 2 241 443 | 9/1991 |
| JP | 62-194935 | 8/1987 |
| JP | 63-284098 | 11/1988 |

OTHER PUBLICATIONS

Written Opinion of the International Searching Authority for PCT/GB2008/050156 mailed Jun. 12, 2008.

Notice of Reasons for Rejection mailed Nov. 6, 2012 in JP 2009-553219.

* cited by examiner

WATER SCAVENGING SYSTEM

This application is the U.S. national phase of International Application No. PCT/GB2008/050156 filed 5 Mar. 2008 which designated the U.S. and claims priority to GB Application No. 0704725.1 filed 12 Mar. 2007; and GB Application No. 0710621.4 filed 4 Jun. 2007, the entire contents of each of which are hereby incorporated by reference.

FIELD OF THE INVENTION

The present invention relates to a water scavenging system.

BACKGROUND OF THE INVENTION

A method of removing water from an aircraft fuel tank is described in U.S. Pat. No. 4,809,934. A water scavenge pipe collects water which is dispersed in the fuel immediately upstream of a booster pump. A first problem with this system is that it requires a complex arrangement of venturis and jet pumps. A further problem is that water may be fed to the engine when the engine is operating at a relatively low rate. This may reduce the operating efficiency of the engine. A further problem is that the system may not remove water entirely from the fuel tank during a single flight.

A method of removing water from a fuel tank is described in U.S. Pat. No. 6,170,470. A water line feeds water into an engine from the fuel tank. A valve in a water line is opened when the speed of the engine is above a minimum threshold, because water flowing into the engine when the engine is operating at relatively high speeds will not have a significantly adverse effect on the operational characteristics of the engine. A problem with the method of U.S. Pat. No. 6,170,470 is that an engine speed measuring device must be provided, along with a communication line to the valve. Both of these elements are at risk of failing, and the communication line must be routed out of the fuel tank in a fluid-tight and inherently safe manner.

A particular difficulty associated with an aircraft fuel system is that once the aircraft has taken off the ambient air temperature drops to −30 or −40 deg C. and the water in the fuel freezes after approximately 20 minutes. After the water has frozen it is trapped in the tank until the tank thaws on landing. Therefore if the water is not removed in the first twenty minutes it will gradually accumulate over several flights until it causes problems or is manually drained.

SUMMARY OF THE INVENTION

A first aspect of the invention provides a method of removing water from a fuel tank using a water scavenging line which has an inlet immersed in the water and an outlet coupled to a water tank, the method comprising filling the fuel tank with fuel whereby the fuel exerts hydrostatic pressure on the water, the hydrostatic pressure driving the water up the water scavenging line against the force of gravity and into the water tank.

A second aspect of the invention provides a water scavenging system for removing water from a fuel tank, the water scavenging system comprising:
  a water tank; and
  a water scavenging line which has an outlet coupled to the water tank,
  wherein the water scavenging line has an inlet which can be immersed when in use in water at a bottom of the fuel tank below the outlet of the water scavenging line, whereby hydrostatic pressure can drive the water up the water scavenging line against the force of gravity and into the water tank.

The use of hydrostatic pressure provides an automatic and relatively simple method of extracting the water from the bottom of the fuel tank. The water tank enables the extracted water to be stored for disposal at a later time.

Preferably the inlet of the water scavenging line is positioned in the fuel tank at a location where water tends to accumulate during refuelling. Typically this is at the lowest point of the fuel tank.

The water may be trapped in the water tank by a non-return valve, or by positioning the outlet of the water scavenging line higher than the lowest point of the water tank. In the latter case, a portion of the water scavenging line may extend through a wall of the water tank, such as a bottom wall or side wall.

It will be understood that the fuel tank may be completely filled with fuel, or only partially filled with fuel. As long as the fuel tank is filled above the outlet of the water scavenging line then it will exert sufficient hydrostatic pressure to drive the water into the water tank.

The water may be removed from the water tank by simply draining the water tank at regular intervals. However a problem with this approach is that it adds to the maintenance requirements of the system, since a manual draining operation must be performed at regular intervals, the interval depending on the size of the water tank. Also, a relatively large water tank is required.

Therefore preferably water from the water tank is fed into an engine, typically also using hydrostatic pressure. This removes the need for a manual draining operation, and enables a relatively small water tank to be used.

Preferably the water tank has a capacity which is less than 0.1% of the capacity of the fuel tank, although in the case where the water tank is manually drained, then it may have a larger capacity of the order of 0.5% (but preferably no greater than 1%) of the capacity of the fuel tank.

Typically the fuel tank is an aircraft fuel tank, although the system may be used in other applications such as automotive fuel systems.

In the case where the system is configured to remove water from an aircraft fuel tank, then the inlet of the water output line may be offset towards the rear of the water tank relative to the direction of travel of the aircraft. As a result, water will tend to flow towards the inlet of the water output line when the aircraft is pitching up. In this case, preferably the inlet of the water output line is also positioned higher than the lowest point of the water tank. This prevents the water from flowing into the water output line when the aircraft is level.

Similarly, in the case where the system is configured to remove water from an aircraft fuel tank, then the outlet of the water scavenging line may be offset towards the front of the water tank relative to the direction of travel of the aircraft. As a result, the system can be self priming since fuel will tend to flow towards the water scavenging line and into the fuel tank when the aircraft is pitching down during descent and landing.

Preferably the outlet of the water scavenging line is positioned forward of the inlet of the water output line relative to the direction of travel of the aircraft, providing both of the advantages mentioned above.

Preferably the water tank has a capacity that is between 2 and 5 times the maximum volume of water that is expected to accumulate per flight or journey. The ratio of water volume to fuel volume is approximately 40 ppm (0.004%);

for a typical 8000 liter fuel tank the water accumulated per journey is 0.32 liter and the water tank would be sized to hold between 0.6 and 1.5 liters.

Where the system is installed in an aircraft, then preferably a valve in the water output line is opened in response to an increase in an effective pitch of the aircraft and/or in response to a decrease in an effective pitch of the aircraft.

In the case where the valve opens in response to an increase in effective pitch, then the valve provides a substitute for an engine speed measuring device, since it opens automatically in response to an increase in the effective pitch of the aircraft during take off and climb. Since the engine speed will be relatively high at take off and climb, this means that the water will be fed into the engine without significantly affecting its operational characteristics.

One of the particular difficulties of an aircraft fuel system is that once the aircraft has taken off the ambient air temperature drops to −30 or −40 deg C. and the water in the fuel freezes after approximately 20 minutes. After the water has frozen it is trapped in the tank until the tank thaws on landing. Therefore if the water is not removed in the first twenty minutes it will gradually accumulate over several flights until it causes problems or is manually drained. Therefore a further advantage of feeding the water into the engine during take off and climb is that it gets rid of the water before it freezes.

In the case where the valve opens in response to an decrease in effective pitch, then the valve enables the water tank (now full of fuel only as all the water has been fed to the engine during take off and climb) to be emptied during descent and landing of the aircraft, ready for the next refuel operation.

Preferably the valve has a closed configuration in which the valve impedes the flow of water in the water output line; and positive and negative open configurations in which the valve permits water to flow through the valve, wherein the valve is configured to change from its closed configuration to its positive open configuration in response to an increase in effective angle of the valve; and wherein the valve is configured to change from its closed configuration to its negative open configuration in response to a decrease in effective angle of the valve. Alternatively, a thermostatically controlled valve may be provided in parallel with the water output line, the thermostatically controlled valve opening when the temperature drops below a certain temperature.

Preferably the water tank has an opening at its top which can permit fuel to flow into the water tank when in use.

In certain embodiments of the invention, the inverse aspect ratio of the water tank (as defined below) is greater than 2, most preferably greater than 4. This maximises the head of water in the water tank, so that hydrostatic force can be used to drive the water out of the water tank. In one embodiment of the invention, the water tank is long in the direction of travel, so the inverse aspect ratio of the water tank is lower than 1.

BRIEF DESCRIPTION OF THE DRAWINGS

Embodiments of the invention will now be described with reference to the accompanying drawings, in which.

DETAILED DESCRIPTION OF
EMBODIMENT(S)

Figure 1:
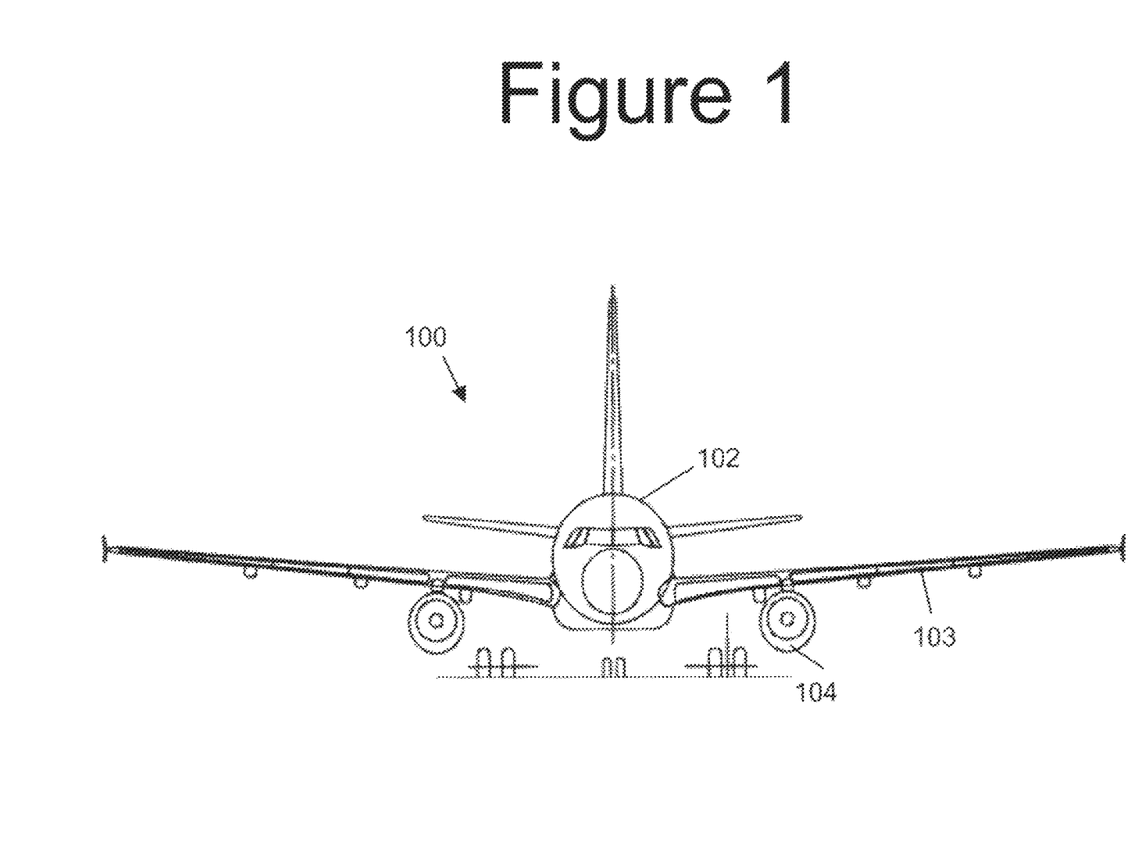
FIG. 1 shows an aircraft.

Referring to FIG. 1, an aircraft 100 comprises a fuselage 102 carrying a pair of wings, the left wing being labelled 103. Each wing carries an engine, the left hand engine being labelled 104 in FIG. 1. Fuel for each engine is stored in a centre tank and one or more wing tanks.

Figure 2:
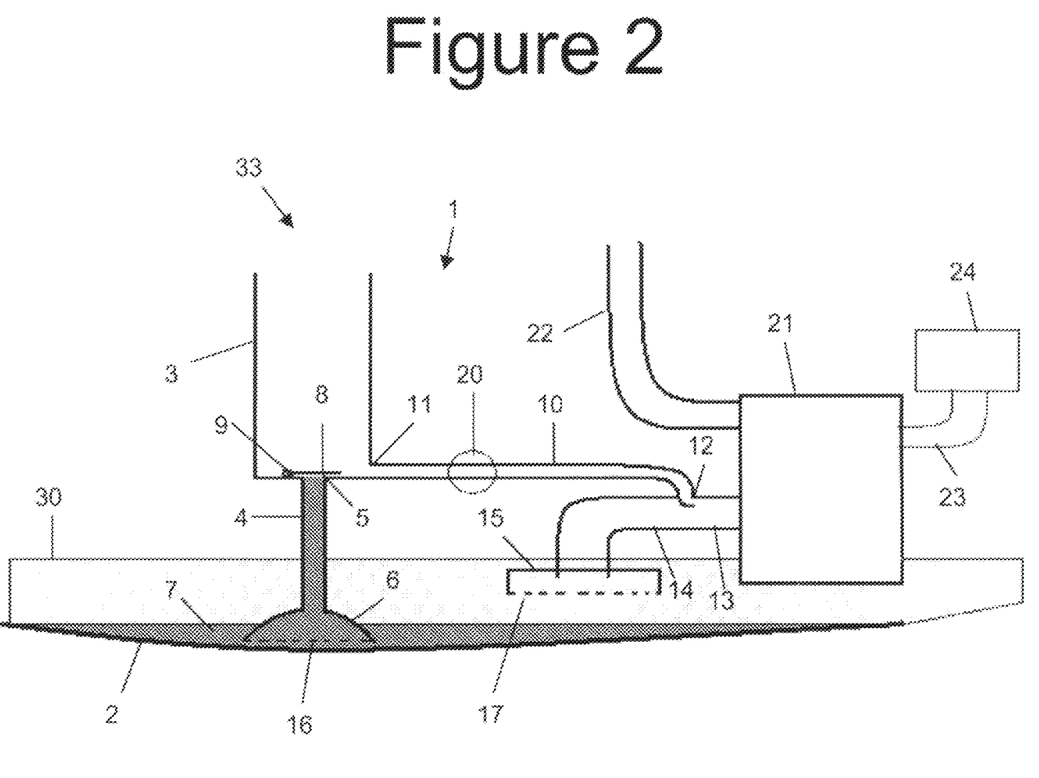
FIGS. 2-5 are schematic views of a fuel tank incorporating a water scavenging system.

A water scavenging system 1 is shown in FIG. 2, installed in one of the wing tanks 2. The water scavenging system comprises a water tank 3; and a water scavenging line 4 which has an outlet 5 in the bottom of the water tank 3, and an inlet 6 immersed in a pool of water 7 at the bottom of the fuel tank 2. The water tank 3 is typically a 60 mm diameter vertical pipe with a length of 0.4 m and an open top.

A non-return valve 8 is mounted to the water tank on a pivot 9 and is shown in its closed position in FIG. 2, in which it closes the outlet 5 of the water scavenging line 4. It will be appreciated that many other types of non-return valve may be used, and the design shown in FIGS. 2-5 is for illustrative purposes only. For instance the non-return valve may comprise a cone closure member mounted on a conical seat, in which the cone translates between its open and closed positions.

Figure 3:
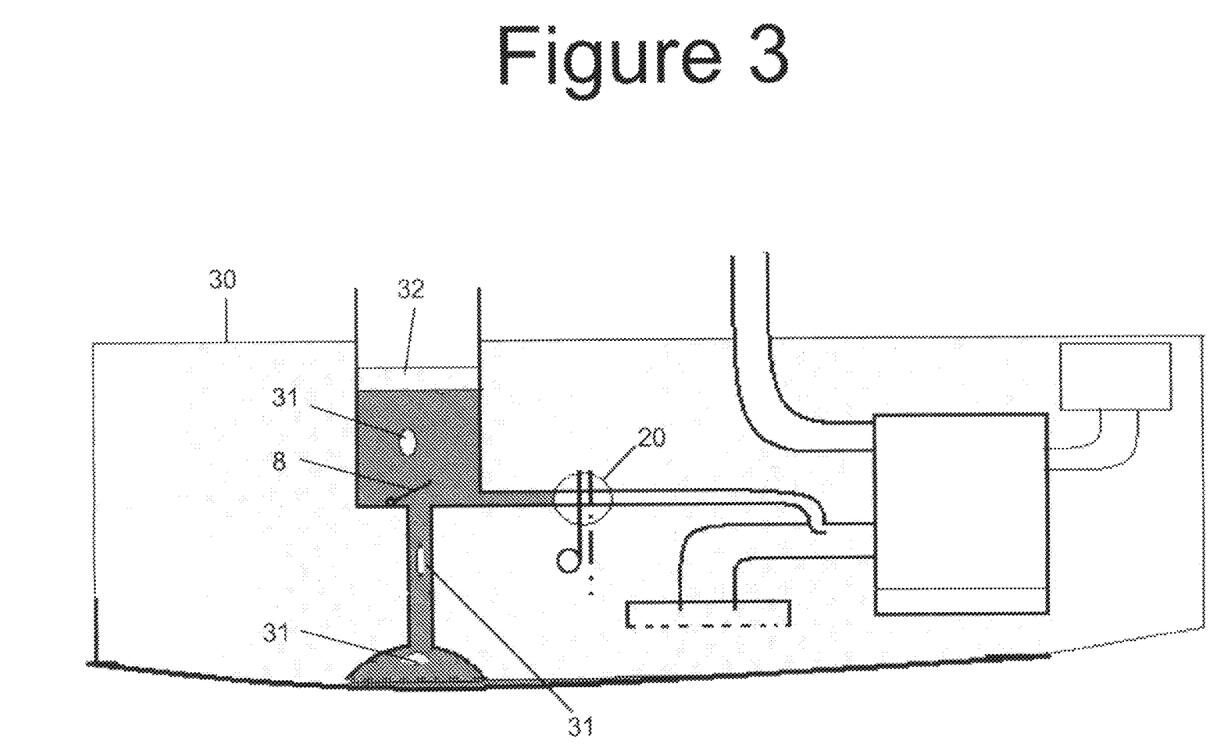
Figure 4:
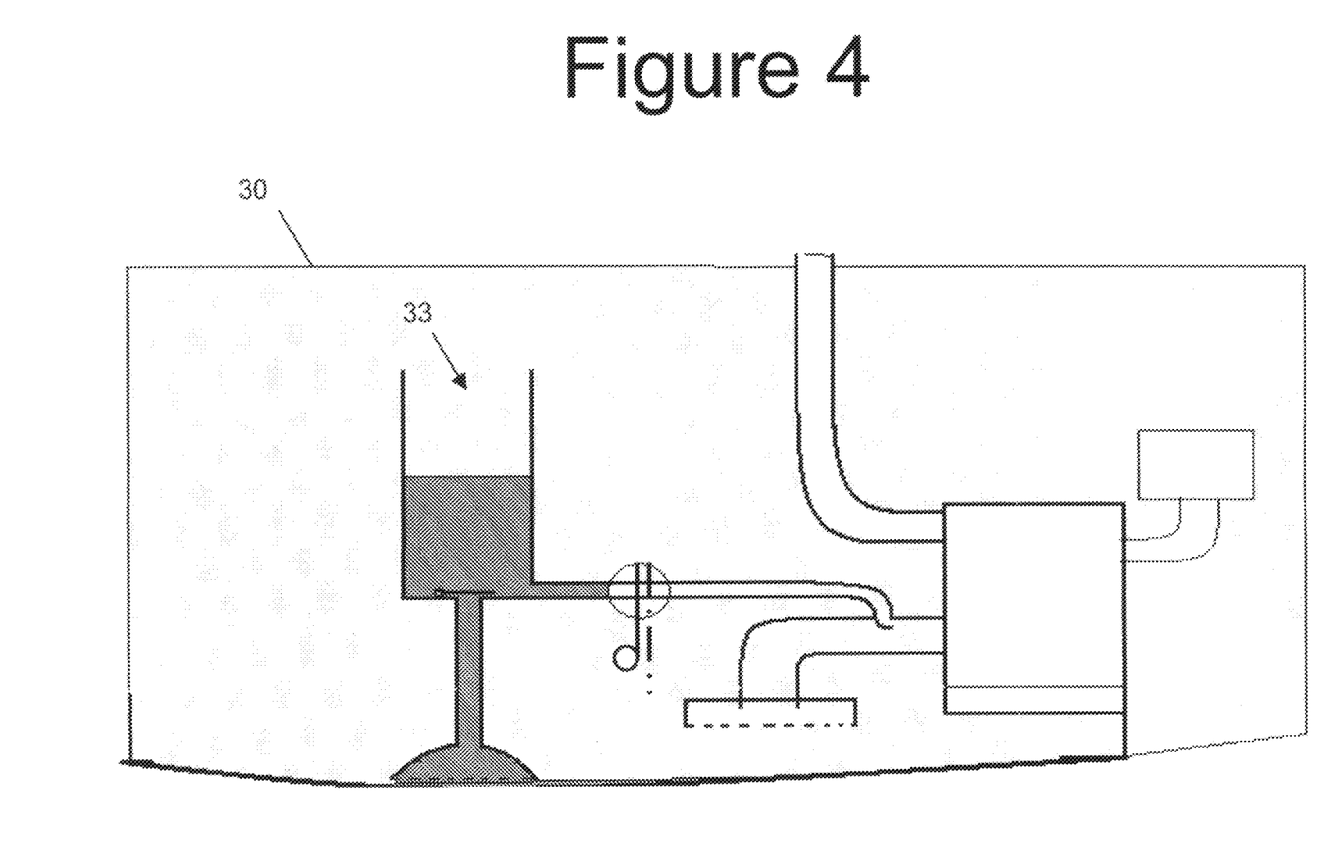

FIGS. 2-4 show fuel 30 in the tank 2 at relatively low, medium and high levels respectively. As the fuel tank is filled, the fuel exerts gravitational hydrostatic pressure on the water 7 pooled at the bottom of the fuel tank. This hydrostatic pressure drives the water up the water scavenging line 4, through the non-return valve 8, and into the water tank 3 against the force of gravity, until the water has been almost completely removed from the bottom of the fuel tank as shown in FIG. 3. As the fuel tank continues to fill, fuel bubbles through the water (three of such fuel bubbles being shown at 31 in FIG. 3) and collects in a layer 32 at the top of the water tank 3.

When the level of fuel reaches the top of the water tank 3, fuel flows into the water tank through the opening 33 at the top of the water tank, filling it as shown in FIG. 4.

Returning to FIG. 2, a water output line 10 extends from the bottom of the water tank 3. The water output line has an inlet 11 in the water tank 3, and an outlet 12 coupled to an pump inlet line 13 in parallel with a fuel uptake line 14. The fuel uptake line 14 has an inlet 15 in the fuel tank positioned at a higher level than the inlet 6 of the water scavenging line. The inlets 6,15 have filters or strainers 16,17 respectively.

The pump inlet line 13 leads to a pump 21. A pump output line 22 leads from the pump to the engine 104 (shown in FIG. 1), and a recirculation line 23 leads from the pump to a valve 24 in the fuel tank. The valve 24 can be opened to "de-rate" the pump 21, allowing the pump 21 to continue operating whilst bypassing the pump output line 22.

Figure 5:
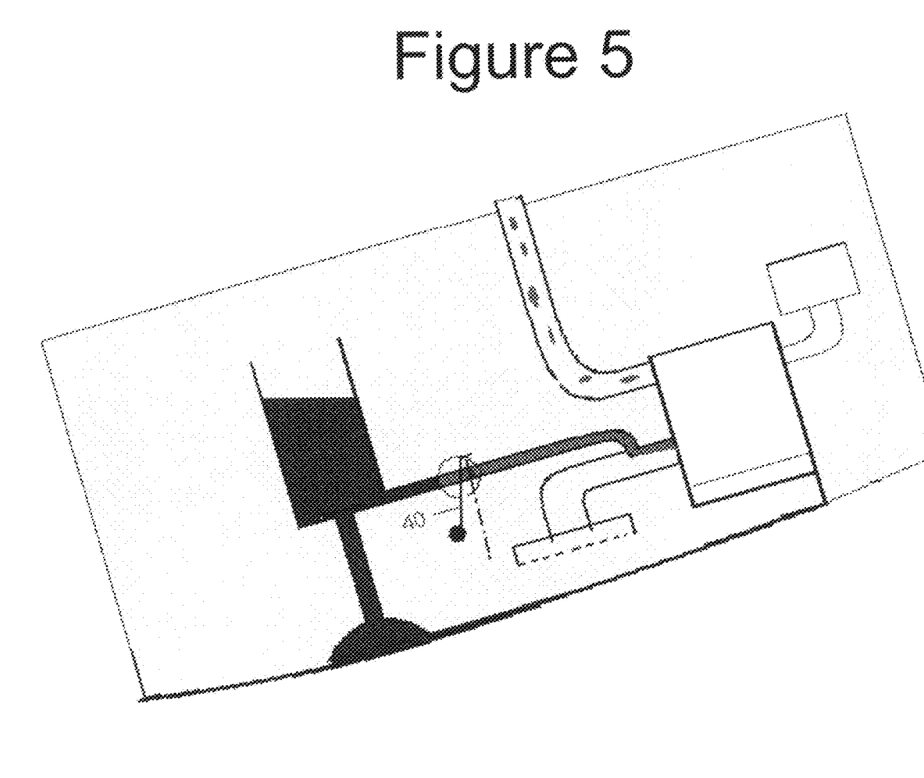
Figure 6A:
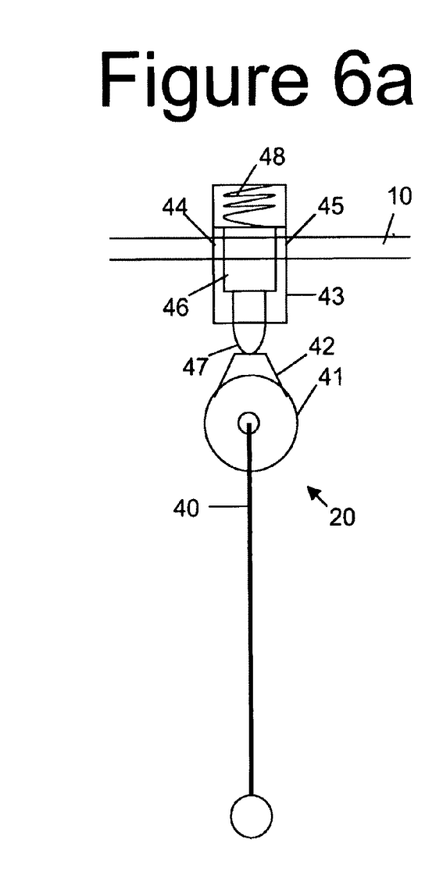
FIGS. 6a-6c show the pendulum valve in detail.
Figure 6B:
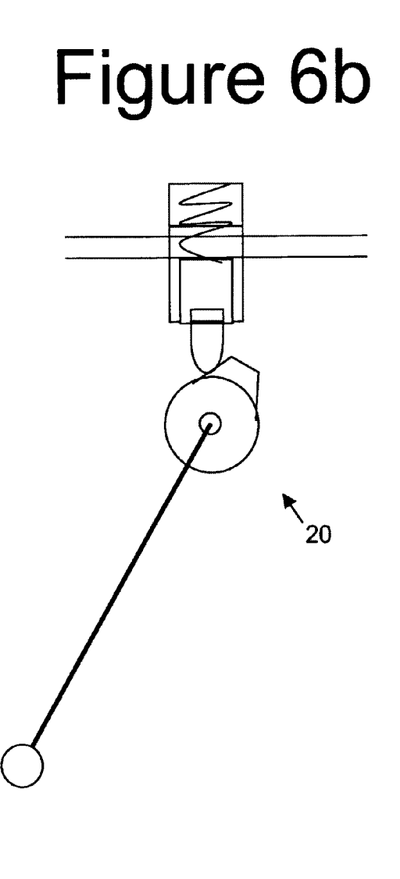
Figure 6C:
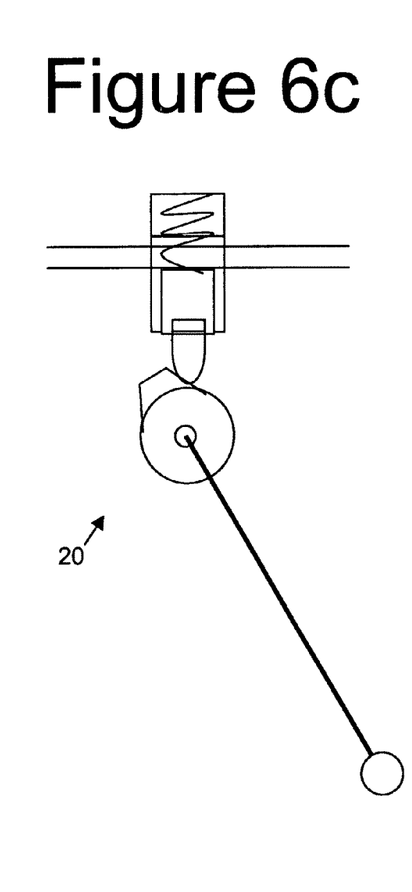

A valve 20 in the water output line 10 is shown schematically in FIGS. 3-5, and in further detail in FIGS. 6a-c.

The valve 20 comprises a pendulum 40 which is pivoted to a support structure (not shown) by an axle 41. The axle 41 carries a cam 42. A chamber 43 in the water output line 10 has an inlet 44 and an outlet 45. A gate 46 is mounted in the chamber 43 and can translate between its closed position shown in FIG. 6*a* to its open position shown in FIGS. 6*b* and 6*c*. In its closed position the gate 46 blocks the inlet 44 and the outlet 45 of the chamber 43, and in its open position the gate 46 permits fluid to flow through the valve as shown in FIGS. 6*b* and 6*c*.

The gate 46 has a cam follower 47 which is biased against the cam 42 by a coil compression spring 48.

When the aircraft is level, the valve 20 is in its closed configuration shown in FIGS. 3, 4 and 6*a*. When the "effective pitch" of the aircraft increases above 7 degrees, the valve 20 changes from its closed configuration to its positive open configuration shown in FIGS. 5 and 6*b*. "Effective pitch" is defined as the combination of physical pitch (that is, the physical pitch angle of the aircraft) combined with the acceleration vector due to forward acceleration.

With the valve 20 open as shown in FIG. 5, the water is driven along the water output line 10 and supplied to the pump 21 by hydrostatic pressure resulting from the gravity head of the water in the water tank. Note that the gravity head driving the water along the water output line 10 is relatively large due to the greater density of water compared with fuel. In other words the gravity head is greater than would be the case if the water tank 3 was filled with fuel. Thus the gravity head tends to drive water towards the fuel pump in preference to fuel from the fuel uptake line 14, at least as long as the level of the water in the water tank is above the outlet 12 of the water output line 10. Optionally an inductor pipe (not shown) protruding into the water output line 10 may also be provided. This provides a slight restriction in the water output line 10 and tends to enhance the flow due to the Venturi effect.

Note that the arrangement shown in FIGS. 2-5 is schematic, and the water tank 3 may be adjusted to be directly above the outlet 12 of the water output line 10, if required to give sufficient gravity head at all desired angles of pitch, and all levels of water in the water tank.

Note also that the water tank 3 is designed to be relatively tall and narrow so as to maximise the gravity head. More specifically, the inverse aspect ratio (which we define herein as $H/\sqrt{A}$, where H is the height of the water tank and A is its mean cross-sectional area) is relatively high. For instance in the case of a cylindrical water tank with a 60 mm diameter and a length of 0.4 m the inverse aspect ratio of the water tank is approximately 7.5.

If the water tank 3 is subjected to negative gravity forces, then the water may empty out of the opening 33 at the top of the water tank 3 into the fuel tank 2. However, since the water tank 3 is relatively small (having a capacity of the order of one liter compared with the fuel tank 2 which has a capacity of the order of 8,000 liters) this should not affect performance. Also, any water that empties in this manner will be picked up at the next refuel.

The water tank 3 is sized to give a 0.5 liter flow in the two to three minutes during take off and climb. The resulting water concentration to the engine is approximately 2500 ppm during this phase.

After take off and climb, the valve 24 is opened to "de-rate" the pump 21, and the centre tank pumps take over. At the same time, as the pitch of the aircraft drops below 7 degrees, the valve 20 closes to its closed position shown in FIG. 6*b* and fuel is input to the pump exclusively through the fuel uptake line 14.

As the aircraft goes "nose down" during descent, the effective pitch of the aircraft drops below −5 degrees, and the valve 20 changes from its closed configuration to its negative open configuration shown in FIG. 6*c*. At this stage, the water tank 3 may be empty, or may contain a head of fuel above the fuel level in the rest of the fuel tank. Note that there will be little or no water in the water tank 3 (the majority of the water having been fed to the engine previously during take off and climb) but the water tank 3 may contain some fuel. Note that if there was a significant amount of water present in the water tank it would have frozen and may jam the drain valve 20. If the water tank 3 contains fuel, then this fuel will be fed to the engine during descent, emptying the water tank ready for the next refuelling.

Figure 7A:
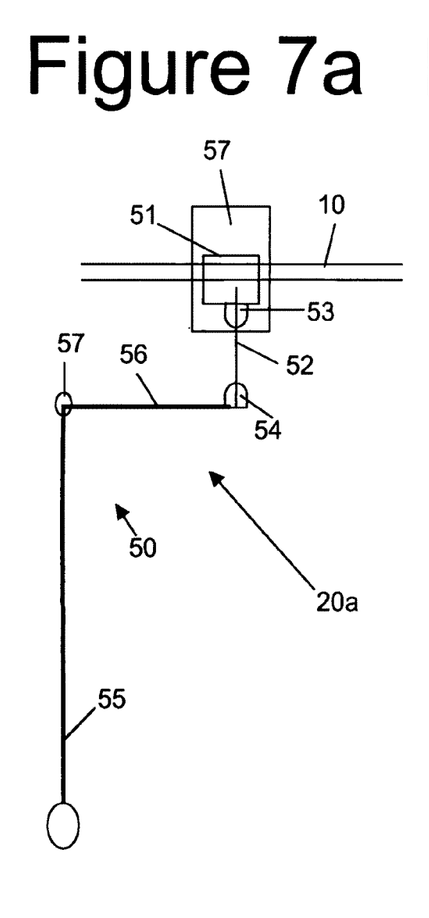
FIGS. 7a-7c show a first alternative pendulum valve.
Figure 7B:
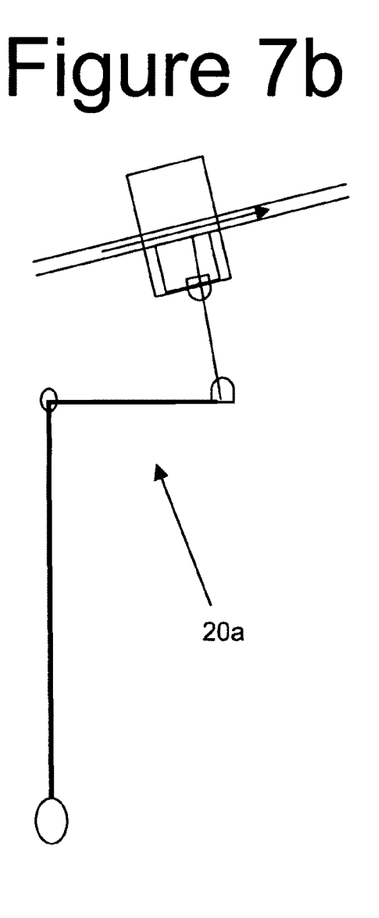
Figure 7C:
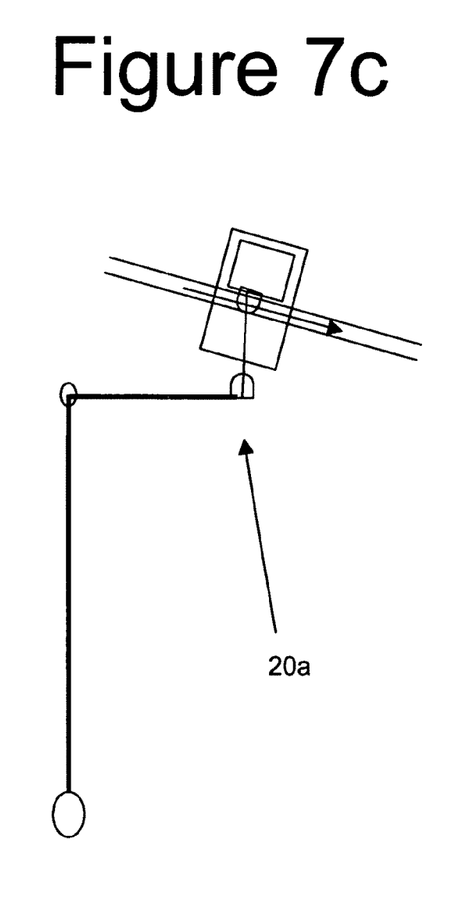

A first alternative pendulum valve 20*a* (which can be used instead of the valve 20) is shown in FIGS. 7*a*-7*c*. In this case, instead of employing a cam and cam-follower, the valve comprises a pendulum 50 which is coupled to a gate 51 by an articulated link 52. The pendulum 50 has a vertical arm 55 and a horizontal arm 56 which are fixed with respect to each other, and pivoted to a support structure (not shown) by an axle 57. The link 52 is rotatably coupled to the gate 51 at one end by a pivot 53 and to the horizontal arm 56 of the pendulum 50 at the other end by a pivot 54. The gate 51 is slidably mounted in a chamber 57 which protrudes from the water output line on both upper and lower sides, and is driven by the link 52 between its three operating positions as shown in FIGS. 7*a*-7*c*.

Figure 8A:
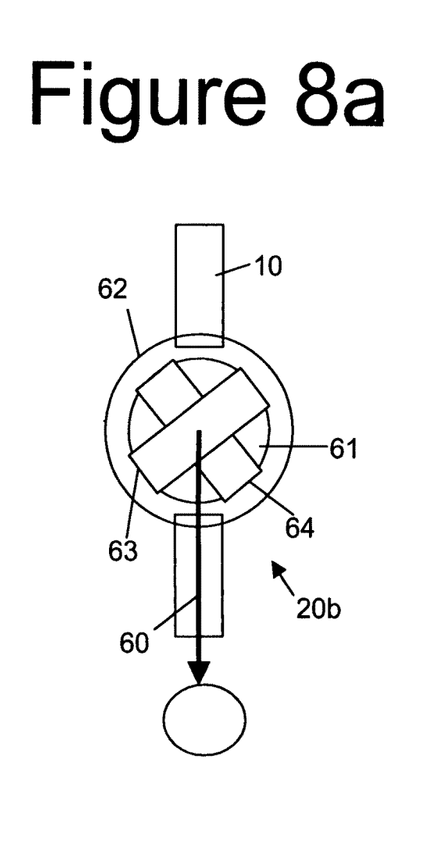
FIGS. 8a-8c show a second alternative pendulum valve.
Figure 8B:
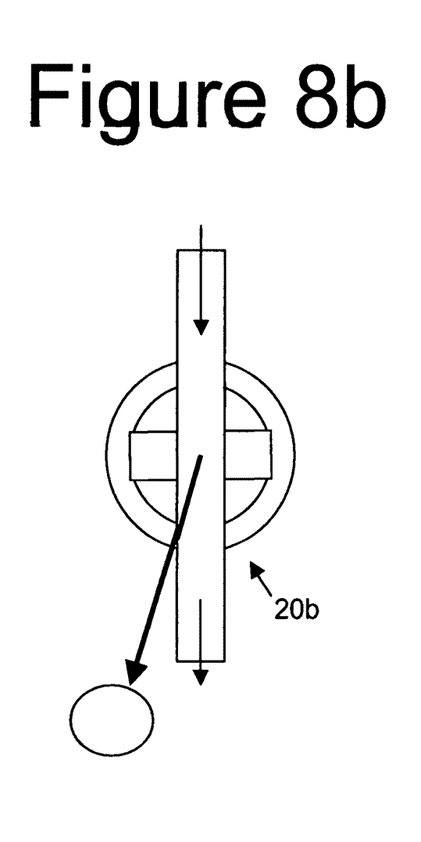
Figure 8C:
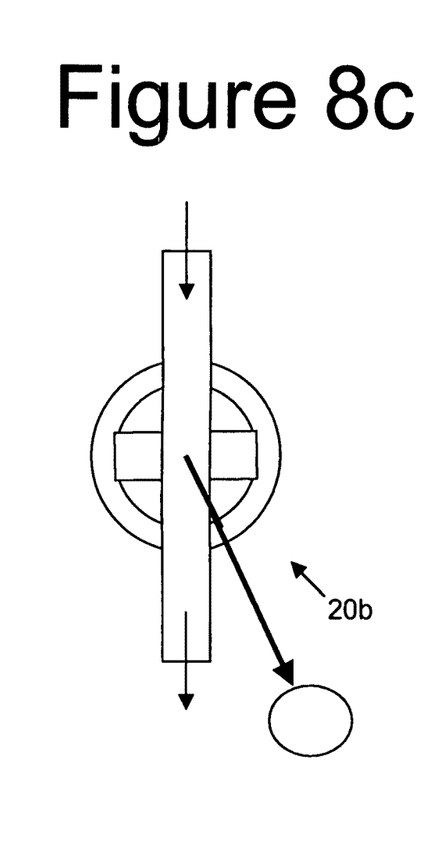

A second alternative pendulum valve 20*b* (which can be used instead of the valve 20 or the valve 20*a*) is shown in FIGS. 8*a*-8*c*. In this case, instead of employing a translating gate, the valve 20*b* has a closure member which rotates between its open and closed positions.

Specifically, the valve 20*b* comprises a pendulum 60 mounted on a cylindrical closure member 61 which is housed in a cylindrical chamber 62 in the water output line 10. The closure member 61 has a pair of channels 63,64 which line up with the inlet and outlet of the chamber 62 when the angle of the pendulum relative to the water output line reaches +7 degrees or −5 degrees, as shown in FIGS. 8*b* and 8*c* respectively. Note that for ease of illustration the water output line 10, chamber 62 and closure member 61 are shown lying vertically and parallel with the pendulum 60: in practice they will be oriented horizontally and at right angles to the pendulum 60. Also, the angular deviation between the channels 63,64 is exaggerated in FIGS. 8*a*-8*c* for ease of illustration. In practice the channels will extend at a narrower angle (and the chamber 62 and closure member 61 will be larger relative to the water output line 10) to give the required operation.

The advantages of the valve 20 shown in FIGS. 6*a*-6*c*, compared with the valves shown in FIGS. 7*a*-7*c* and 8*a*-8*c* are:

1. the opening and closing characteristics of the valve can be easily adjusted by adjusting the shape and/or size and/or position of the cam 42;
2. because the gate 46 has only two operating positions, the chamber 43 is relatively compact;
3. the pendulum can be easily separated from the rest of the valve for maintenance purposes; and
4. if the pitch of the aircraft overshoots (that is, if the pitch increases substantially above +7 degrees, or decreases substantially below −5 degrees or if there is a high acceleration or deceleration) then the operation of the valve is not affected.

In an alternative embodiment (not shown) several water tanks, each with its own respective scavenging line and water output line, may all be coupled in parallel to the engine via a single shared pendulum valve 20.

In a further alternative embodiment (not shown) a thermostatically controlled drain valve may be installed in a line in parallel with the pendulum valve 20, 20a or 2b. The thermostatically controlled valve opens when the temperature drops below 2 deg C. (say), which will occur as the aircraft cruises at altitude. This ensures that all water is removed from the water tank. Optionally the thermostatically controlled valve could replace the "nose down" operation of the pendulum valve 20, 20a, 20b: that is, the pendulum valve 20, 20a, 20b may be replaced by a similar pendulum valve with only a positive open position. The thermostatically controlled valve could for example be a wax-type valve as used in car-engine thermostats or a bimetallic spring that opens a valve.

Figure 9A:
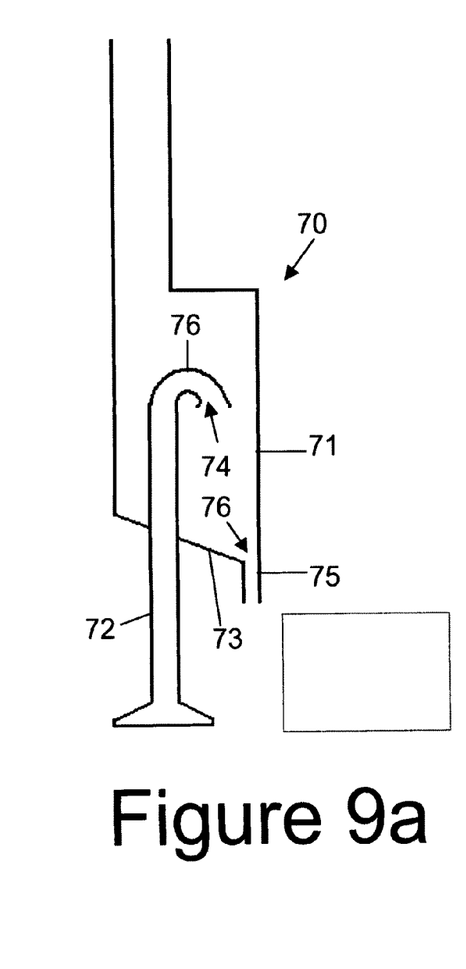
FIG. 9a shows a water scavenging system according to a further embodiment of the invention.

FIG. 9a shows a water scavenging system 70 according to a further embodiment of the invention. The water scavenging system comprises a water tank 71; and a water scavenging line 72 which extends through the bottom wall 73 of the water tank. As the fuel tank is filled, the fuel exerts gravitational hydrostatic pressure on water pooled at the bottom of the fuel tank (not shown). This hydrostatic pressure drives the water up the water scavenging line 72 and into the water tank 71 against the force of gravity.

In contrast with the embodiment of FIG. 2, the outlet 74 of the water scavenging line 72 has no non-return valve. Instead, water is prevented from flowing back into the water scavenging line by positioning its outlet 74 above the bottom wall 73 and higher than the lowest point of the water tank. The outlet 74 is positioned sufficiently high to ensure that when all of the water from the fuel tank has been driven into the water tank, the water level remains below the outlet 74. The outlet 74 is also positioned sufficiently low to ensure that the hydrostatic pressure from the head of fuel is sufficient to drive the water into the water tank.

The lack of non-return valve in the water scavenging line provides an advantage in terms of simplicity and reliability compared with the embodiment of FIG. 2.

A curved guide wall 76 in the water scavenging line is directed towards the bottom of the water tank. This prevents the water from spurting out of the top of the water tank, and guides the water towards the bottom 73 of the water tank, which slopes down towards the lowest point of the fuel tank and the inlet 76 of a water output line 75. The water output line 75 leads to a pump inlet line (not shown) via a pitch controlled valve (not shown) in a similar manner to the water output line 10 in the embodiment of FIG. 2.

Figure 9B:
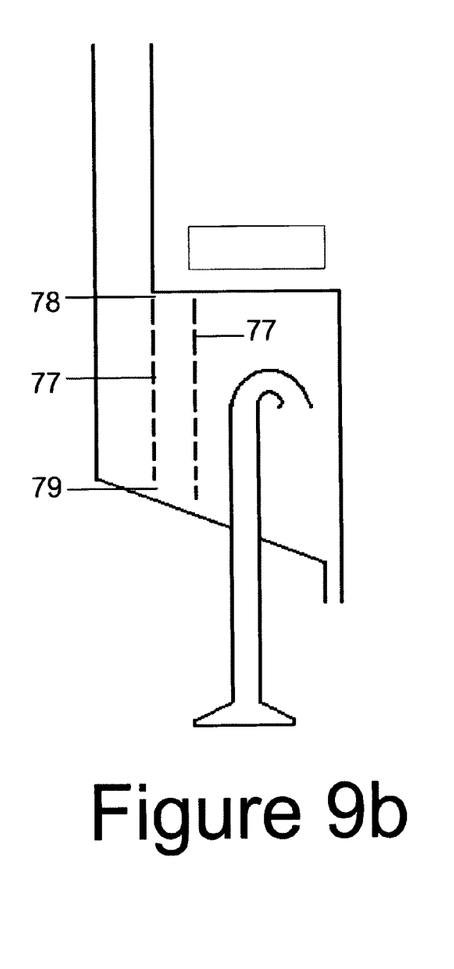
FIG. 9b shows a water scavenging system with a pair of screens.

FIG. 9b shows a variant on the system of FIG. 9a, incorporating a pair of perforated screens 77 which help separate water globules from the fuel. A gap 78 is left at the top of the screens to prevent air locks and a gap 79 is left at the bottom of the screens to allow water to feed to the water output line.

Figure 10A:
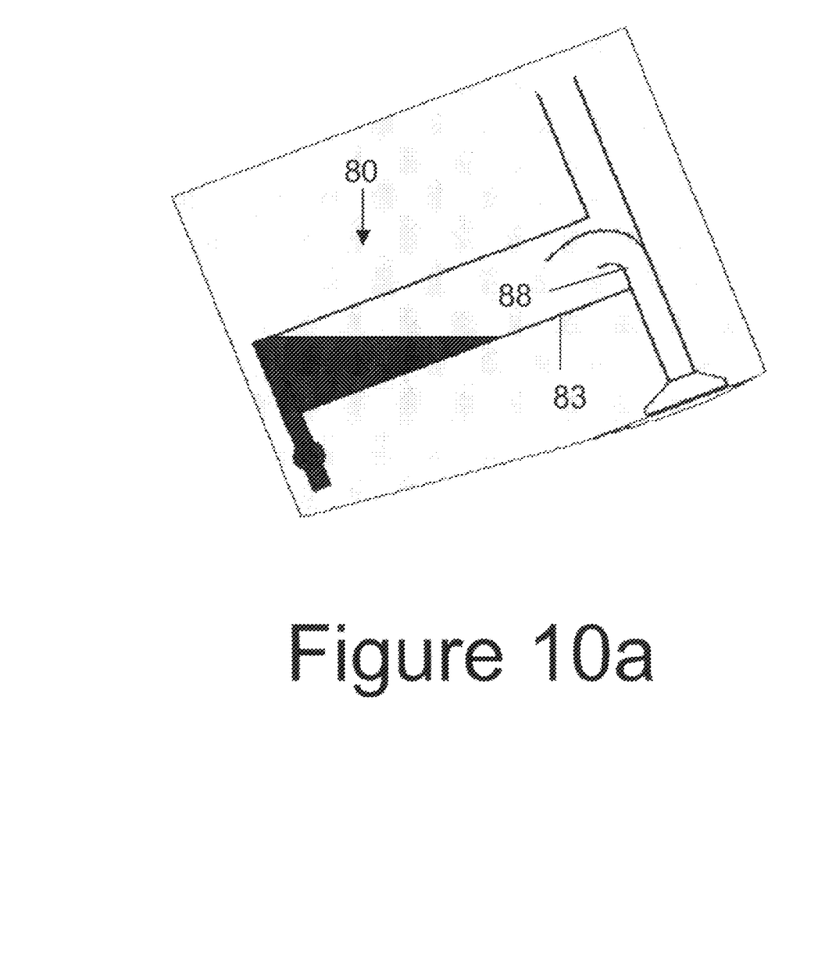
FIG. 10a shows a water scavenging system according to a further embodiment of the invention with the aircraft pitching up.
Figure 10B:
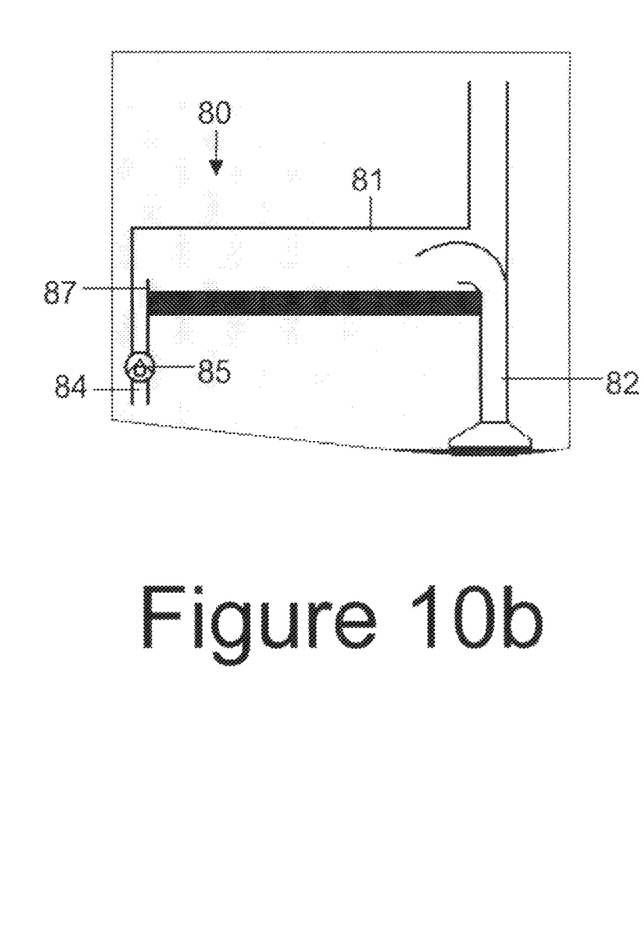
FIG. 10b shows the system of FIG. 10a with the aircraft level.
Figure 10C:
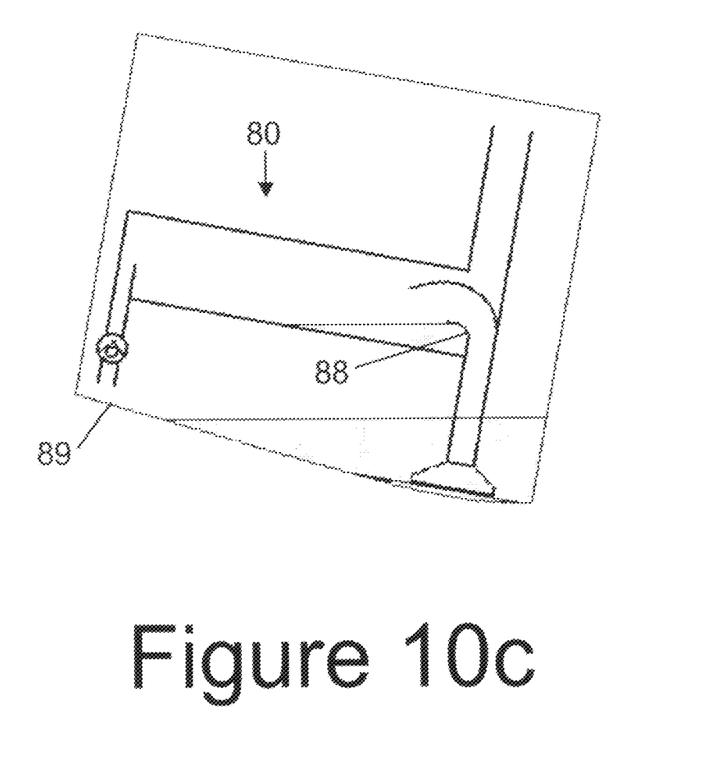
FIG. 10c shows the system of FIG. 10a with the water tank emptied and the aircraft pitching down.

FIGS. 10a-10c show a water scavenging system 80 according to a further embodiment of the invention. The water scavenging system comprises a water tank 81; and a water scavenging line 82 which extends through the bottom wall 83 of the water tank in a similar manner to the water scavenging line 72 shown in FIG. 9a.

A water output line 84 leads to a pump inlet line (not shown). However in contrast with the embodiment of FIG. 2, no pitch controlled valve is required in the water output line. Instead, only a relatively simple non-return valve 85 is required The inlet of the water output line 84 is offset towards the rear of the water tank and positioned higher than the lowest point of the water tank, with a stub or dam 87 between the inlet and the bottom wall 83 of the water tank. As a result, when the aircraft pitches up during take off and climb as shown in FIG. 10a, the water level rises over the top of the stub 87 and into the water output line 84.

Similarly, the outlet of the water scavenging line 82 is offset towards the front of the water tank and positioned higher than the lowest point of the water tank, with a stub or dam 88 between the inlet and the bottom wall 83 of the water tank. As a result, when the aircraft pitches down during descent and landing as shown in FIG. 10c, the fuel level rises over the top of the stub 88, into the water scavenging line 82 and into the fuel tank 89.

Thus the arrangement of FIGS. 10a-10c can work without a pitch controlled valve. A further advantage of this system is that it is self priming as most of the fuel will be emptied from the tank during descent and landing as shown in FIG. 10c. The water tank has a large area (as viewed from above) and is long in the direction of flight to maximise the pitch angle effect during take off and landing. Because the water tank is long and flat the head of water will be less than in the previous embodiments, and because of this it is more likely to require an induction tube to create extra suck at the pump inlet. The non-return valve 85 in the water output line may be necessary as during refuel the hydrostatic pressure is trying to create a flow into the water tank 81 from both the water scavenging line 82 and the water output line 84. Without the non-return valve 85, there is a risk that fuel could flow up the water output line 84 (as fuel is lighter) and thus the water would remain behind in the fuel tank.

Although the invention has been described above with reference to one or more preferred embodiments, it will be appreciated that various changes or modifications may be made without departing from the scope of the invention as defined in the appended claims.

The invention claimed is:

1. A method of removing water from a fuel tank using a water scavenging line which has an inlet immersed in the water and an outlet coupled to a water tank, the method comprising the steps of:
    filling the fuel tank with fuel whereby the fuel exerts hydrostatic pressure on the water, the hydrostatic pressure driving the water up the water scavenging line against the force of gravity and into the water tank; and
    feeding water from the water tank through a water output line and into an engine.

2. The method of claim 1 further comprising using hydrostatic pressure to feed the water from the water tank into an engine fuel line.

3. The method of claim 1 wherein the fuel tank is an aircraft fuel tank.

4. The method of claim 3 further comprising opening a valve in the water output line in response to an increase in an effective pitch of the aircraft.

5. The method of claim 3 further comprising opening a valve in the output line in response to a decrease in an effective pitch of the aircraft.

6. A water scavenging system for removing water from a fuel tank, the water scavenging system comprising:
    a water tank;
    a water scavenging line which has an outlet coupled to the water tank, wherein the water scavenging line has an inlet which is immersed in water at a bottom of the fuel tank at a level below the outlet of the water scavenging line, whereby hydrostatic pressure can drive the water up the water scavenging line against the force of gravity and into the water tank; and a water output line which has an inlet coupled to the water tank, and an outlet which is coupled to an engine fuel line.

7. The system of claim 6 further comprising a non-return valve in the water scavenging line.

8. The system of claim 6 wherein the outlet of the water scavenging line is positioned higher than the lowest point of the water tank.

9. The system of claim 8 wherein a portion of the water scavenging line extends through a wall of the water tank.

10. The system of claim 8 wherein the outlet of the water scavenging line comprises a guide directed towards the bottom of the water tank.

11. The system of claim 6 further comprising a valve in the water output line.

12. The system of claim 11 wherein the valve in the water output line is configured to open and close in response to a change in an effective angle of the valve.

13. The system of claim 12 wherein the valve has a closed configuration in which the valve impedes the flow of water in the water output line; and positive and negative open configurations in which the valve permits water to flow through the valve, wherein the valve is configured to change from its closed configuration to its positive open configuration in response to an increase in effective angle of the valve; and wherein the valve is configured to change from its closed configuration to its negative open configuration in response to a decrease in effective angle of the valve.

14. The system of claim 6 configured to remove water from an aircraft fuel tank, wherein the inlet of the water output line is offset towards the rear of the water tank relative to the direction of travel of the aircraft.

15. The system of claim 14 wherein the inlet of the water output line is positioned higher than the lowest point of the water tank.

16. The system of claim 14 further comprising a non-return valve in the water output line.

17. The system of claim 6 configured to remove water from an aircraft fuel tank, wherein the outlet of the water scavenging line is offset towards the front of the water tank relative to the direction of travel of the aircraft.

18. The system of claim 6 configured to remove water from an aircraft fuel tank, wherein the outlet of the water scavenging line is positioned forward of the inlet of the water output line relative to the direction of travel of the aircraft.

19. The system of claim 6 wherein the water tank has an opening at its top which can permit fuel to flow into the water tank.

20. The system of claim 6 wherein the inverse aspect ratio of the water tank is greater than 2.

21. The system of claim 20 wherein the inverse aspect ratio of the water tank is greater than 4.

22. A fuel tank system comprising:
a fuel tank; and
a water scavenging system according to claim 6, installed with the inlet of the water scavenging line immersed in water at a bottom of the fuel tank and the outlet of the water scavenging line coupled to the water tank above the inlet, whereby hydrostatic pressure drives the water up the water scavenging line against the force of gravity and into the water tank.

23. The system of claim 22 further comprising an engine fuel line coupled in parallel to the water tank and the fuel tank.

24. The system of claim 22 further comprising a pump coupled in parallel to the water tank and the fuel tank.

25. The system of claim 22 wherein the fuel tank is an aircraft fuel tank.

26. The system of claim 22, wherein the water tank has a capacity which is less than 1% of the capacity of the fuel tank.

27. The system of claim 26, wherein the water tank has a capacity which is less than 0.1% of the capacity of the fuel tank.

* * * * *